(12) United States Patent
Marlett et al.

(10) Patent No.: US 9,422,859 B2
(45) Date of Patent: Aug. 23, 2016

(54) ADAPTABLE TURBOCHARGER CONTROL

(71) Applicant: GM GLOBAL TECHNOLOGY OPERATIONS LLC, Detroit, MI (US)

(72) Inventors: Chad E. Marlett, Plymouth, MI (US); Kevin J. McKay, New Hudson, MI (US); Lorenzo Pataccia, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

(21) Appl. No.: 14/197,931

(22) Filed: Mar. 5, 2014

(65) Prior Publication Data

US 2015/0252720 A1  Sep. 10, 2015

(51) Int. Cl.
| | |
|---|---|
| G05B 13/02 | (2006.01) |
| F02B 37/24 | (2006.01) |
| F02B 37/18 | (2006.01) |
| F02B 39/16 | (2006.01) |
| F02D 41/00 | (2006.01) |

(52) U.S. Cl.
CPC ............... *F02B 37/24* (2013.01); *F02B 37/186* (2013.01); *F02B 39/16* (2013.01); *F02D 41/0007* (2013.01); *G05B 13/02* (2013.01); *F02D 2250/16* (2013.01); *Y02T 10/144* (2013.01); *Y02T 10/40* (2013.01)

(58) Field of Classification Search
None
See application file for complete search history.

(56) References Cited

U.S. PATENT DOCUMENTS

| | | | | |
|---|---|---|---|---|
| 4,671,068 | A * | 6/1987 | Moody | F02B 37/24 60/602 |
| 6,272,859 | B1 * | 8/2001 | Barnes | F02B 37/24 60/602 |
| 6,401,457 | B1 * | 6/2002 | Wang | F02B 37/18 123/568.21 |
| 6,907,733 | B2 * | 6/2005 | Nishiyama | F01D 17/165 29/889.22 |
| 7,137,773 | B1 * | 11/2006 | Mc Donald | F01D 17/16 415/1 |
| 7,207,176 | B2 * | 4/2007 | Mulloy | F01D 17/14 415/158 |
| 7,437,874 | B2 * | 10/2008 | Ramamurthy | F02B 37/22 60/285 |
| 7,810,327 | B2 * | 10/2010 | Parker | F01D 17/141 415/158 |
| 8,151,567 | B2 * | 4/2012 | Rollinger | F02B 37/24 60/602 |
| 8,523,511 | B2 * | 9/2013 | Love | F01D 17/165 415/1 |

OTHER PUBLICATIONS

Cho et al. "Study on the position control of the e-actuator for e-VGT", 2011 IEEE, 3 pages.*
Mehmood et al. "Position Tracking of the VGT Single Acting Pneumatic Actuator with 2nd order SMC and Backstepping Control Techniques", 2012 IEEE, pp. 94-99.*

(Continued)

*Primary Examiner* — Van Nguyen
(74) *Attorney, Agent, or Firm* — Quinn Law Group, PLLC

(57) ABSTRACT

A method of adapting operation of a variable geometry turbocharger having a variable position vane mechanism with movable vanes is disclosed. The method includes performing at time T1 a vane sweep between open-limit and closed-limit positions to identify an initial range of movement of the mechanism and storing in controller's memory the initial range of movement. The method additionally includes performing at time T2 a vane sweep between the open-limit and closed-limit positions to identify a current range of movement of the mechanism and storing in controller's memory the current range of movement. The method also includes comparing the current range with the initial range. Furthermore, the method includes replacing in controller's memory the initial range with the current range if the current range is equal to or greater than a predetermined range to thereby adapt the operation of the turbocharger to the mechanism's wear between T1 and T2.

17 Claims, 3 Drawing Sheets

(56) References Cited

OTHER PUBLICATIONS

Wang et al. "New-Style Turbocharger and Its Control System", 2010 IEEE, pp. 551-554.*

Zhang et al. "With the electrical properties of a new turbocharger", 2010 IEEE, 4 pages.*

* cited by examiner

ADAPTABLE TURBOCHARGER CONTROL

TECHNICAL FIELD

The present disclosure relates to a system and a method for adapting operation of a variable geometry turbocharger during the turbocharger's service life.

BACKGROUND

Internal combustion engines (ICE) are often called upon to generate considerable levels of power for prolonged periods of time on a dependable basis. Many such ICE assemblies employ a boosting device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A variable-geometry turbocharger (VGT) is a type of a turbocharger usually designed to allow the effective aspect ratio (A:R) of the turbocharger to be altered in line with engine speed and thus facilitate increased ICE operating efficiency. VGTs tend to be more common on compression ignition or diesel ICE's, as compared to spark ignition ICE's, because lower exhaust temperatures of diesel engines provide a less extreme environment for the movable components of the VGT.

SUMMARY

A method is disclosed of adapting operation of a variable geometry turbocharger (VGT) having a turbine housing and a turbine wheel retained therein. The turbine housing defines an inlet to the turbine wheel. A variable position vane mechanism having a plurality of movable vanes is arranged at the inlet to the turbine wheel. The method includes commanding, via a controller having a memory, the variable position vane mechanism to perform at a time T1 a sweep of the plurality of vanes between an open-limit position and a closed-limit position of the vane mechanism to identify an initial range of movement of the vane mechanism. The method also includes storing in the memory of the controller the identified initial range of movement of the vane mechanism. The method additionally includes commanding, via the controller, the variable position vane mechanism to perform at a time T2 a vane sweep between the open-limit position and the closed-limit position to identify a current range of movement of the vane mechanism.

The method also includes storing in the memory of the controller the identified current range of movement of the vane mechanism. The method additionally includes comparing, via the controller, the current range of movement with the initial range of movement of the vane mechanism. Furthermore, the method includes replacing in the memory of the controller the initial range of movement of the vane mechanism with the current range of movement of the vane mechanism if the current range of movement is equal to or greater than a predetermined range of movement stored in the memory of the controller to thereby adapt operation of the VGT to the wear of the vane mechanism between time T1 and time T2.

The method may also include activating via the controller a sensory indicator if the current range of movement of the vane mechanism is less than the predetermined range of movement.

The sensory indicator may be at least one of a numerical code programmed into the controller and a warning light.

The variable position vane mechanism may include an actuator configured to perform the sweep of the plurality of vanes and communicate the initial and current ranges of movement of the vane mechanism to the controller.

The VGT may be mounted on an internal combustion engine in a motor vehicle. In such a case, the method may be performed at one of every vehicle key-on and every vehicle key-off.

The controller may be a central processing unit arranged on the vehicle and configured to regulate operation of the engine.

The method may additionally include initializing the method by assessing via the controller whether established enabling criteria have been met prior to identifying the initial range of movement of the vane mechanism.

The method may be performed at every vehicle key-off. In such a case, the established enabling criteria may include an ambient temperature being greater than a preset value, engine air intake temperature being within a predetermined acceptable range, no presence of VGT operation faults, and no presence of vane mechanism faults.

Another embodiment of the invention is directed to a vehicle having an internal combustion engine that employs the VGT and the controller configured to regulate operation of the VGT as described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
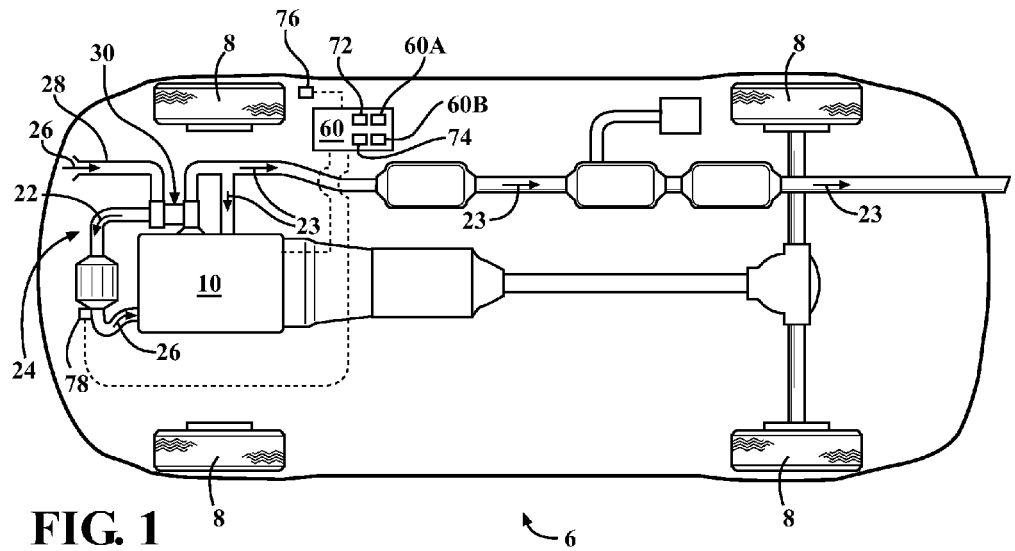
FIG. 1 is a schematic illustration of a vehicle including an internal combustion engine that has a variable geometry turbocharger (VGT) according to the disclosure.
Figure 2:
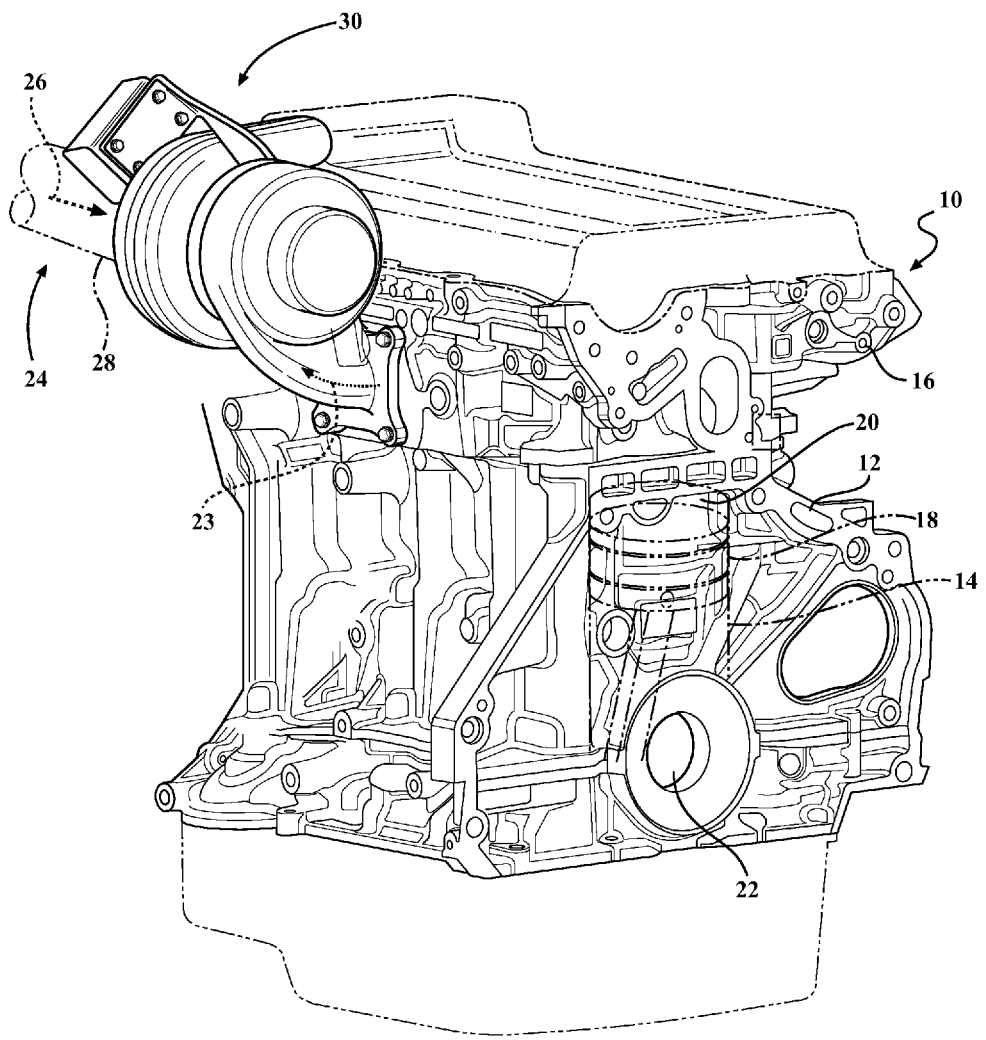
FIG. 2 is a schematic perspective close-up view of the engine shown in FIG. 1.

Referring to the drawings wherein like reference numbers correspond to like or similar components throughout the several figures, FIG. 1 illustrates a vehicle 6 having a plurality of wheels 8 that may be driven by an internal combustion engine (ICE) 10. As shown in FIG. 2, the ICE 10 includes a cylinder block 12 with a plurality of cylinders 14 arranged therein. The ICE 10 also includes a cylinder head 16. Each cylinder 14 includes a piston 18 configured to reciprocate therein. The ICE 10 may be a spark ignition or a compression ignition design.

As shown in FIG. 2, combustion chambers 20 are formed within the cylinders 14 between the bottom surface of the cylinder head 16 and the tops of the pistons 18. As known by those skilled in the art, combustion chambers 20 are configured to receive fuel and air such that a fuel-air mixture may form for subsequent combustion therein. The ICE 10 also includes a crankshaft 22 configured to rotate within the cylinder block 12. The crankshaft 22 is rotated by the pistons 18 as a result of increased pressure from the burning fuel-air mixture in the combustion chambers 20. After the air-fuel mixture is burned inside a specific combustion chamber 20, the reciprocating motion of a particular piston 18 serves to exhaust post-combustion gases 23 from the respective cylinder 14.

The ICE 10 also includes an induction system 24 configured to channel an airflow 26 from the ambient to the cylinders 14. The induction system 24 includes an intake air duct 28, a variable geometry turbocharger (VGT) 30, and an intake manifold (not shown). Although not shown, the induction system 24 may additionally include an air filter upstream of the VGT 30 for removing foreign particles and other airborne debris from the airflow 26. The intake air duct 28 is configured to channel the airflow 26 from the ambient to the VGT 30, while the VGT is configured to pressurize the received airflow, and discharge the pressurized airflow to the intake manifold. The intake manifold in turn distributes the previously pressurized airflow 26 to the cylinders 14 for mixing with an appropriate amount of fuel and subsequent combustion of the resultant fuel-air mixture.

Figure 3:
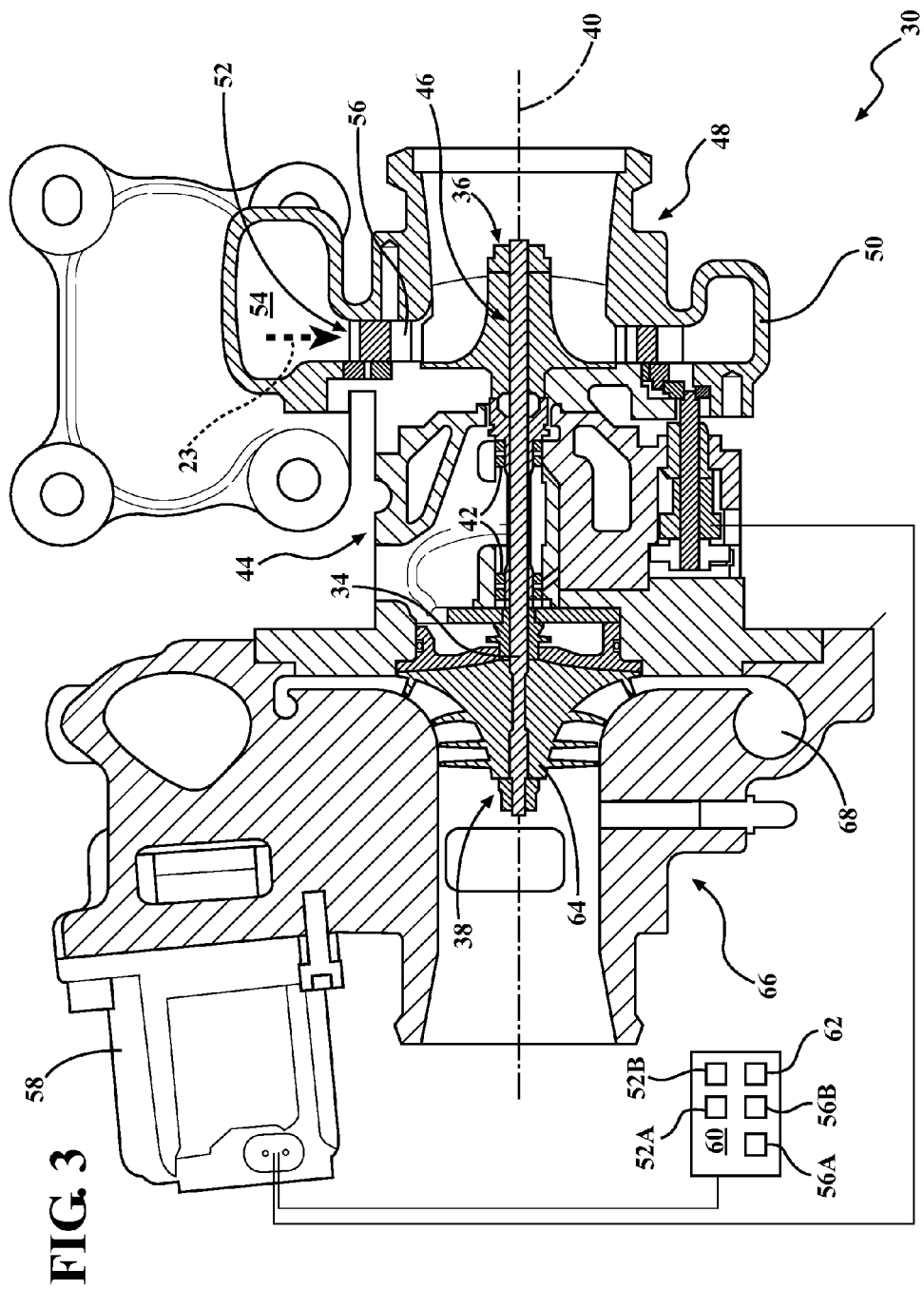
FIG. 3 is a schematic cross-sectional view of the VGT shown in FIGS. 1 and 2.

As shown in FIG. 3, the VGT 30 includes a shaft 34 having a first end 36 and a second end 38. The shaft 34 is supported for rotation about an axis 40 via bearings 42. The bearings 42 are mounted in a bearing housing 44 and may be lubricated by a supply of oil. A turbine wheel 46 is mounted on the shaft 34 proximate to the first end 36 and configured to be rotated about the axis 40 by post-combustion gasses 23 emitted from the cylinders 14. The turbine wheel 46 is retained inside a turbine housing 48 that includes a volute or scroll 50. The scroll 50 defines an inlet 54 to the turbine wheel 46. The scroll 50 receives the post-combustion exhaust gases 23 and directs the exhaust gases to the turbine wheel 46 through the inlet 54. As a result, the turbine wheel 46 and the shaft 34 are rotated by post-combustion gasses 23 about the axis 40. The scroll 50 is configured to achieve specific performance characteristics, such as efficiency and response, of the turbocharger 30.

The VGT 30 also includes a variable position vane mechanism 52. As shown, the vane mechanism 52 includes a plurality of movable vanes 56 arranged at the inlet 54. The vanes 56 are configured to move relative to the turbine housing 48 in order to select a specific aspect ratio (A:R) of the inlet 54 to the turbine wheel 46. As understood by those skilled in the art, the aspect ratio or A:R is defined as the ratio of the width of a shape to its height. The vane mechanism 52 may also include an actuator 58. As shown, the actuator 58 is configured to selectively vary the position of the vane mechanism 52, and specifically the vanes 56 to select a specific A:R of the inlet 54 to the turbine wheel 46. The actuator 58 may have an electro-mechanical configuration, such that the actuator is in electronic communication with an external command source, such as a controller 60 that will be described in detail below. Accordingly, the actuator 58 receives a command signal 62 from the controller 60 to vary the position of the vanes 56 and select a specific A:R of the inlet 54. The actuator 58 is also configured to communicate the initial and current ranges of movement of the vane mechanism to the controller 60. The actuator 58 may also include an internal processor (not shown). In such a case, the actuator 58 would receive pertinent data indicative of vehicle and engine operating conditions from the controller 60, determine appropriate A:R of the inlet 54 for the conditions, and then select the subject A:R of the inlet via the vanes 58.

The vane mechanism 52 is configured to selectively alter the effective aspect ratio (A:R) of the VGT 30 by altering the effective geometry of the turbine housing 48 in line with operating speed of the ICE 10 and thus facilitate increased ICE operating efficiency. Operating efficiency of the ICE 10 can be increased through the use of the vane mechanism 52 because during lower operating speeds of a typical ICE optimum A:R is very different from the A:R that would be optimum during higher operating speeds. In a fixed A:R turbocharger, if the A:R is too large, the turbocharger may produce insufficient boost at lower speeds, on the other hand, if the A:R is too small, the turbocharger may choke the ICE 10 at higher speeds, leading to increased exhaust backpressure and pumping losses, and ultimately result in lower power output. By altering the geometry of the turbine housing 48 as the ICE 10 accelerates, the A:R of VGT 30 can be maintained near its optimum. As a consequence of its ability to operate near optimum A:R, VGT 30 will exhibit a reduced amount of boost lag, have a lower boost threshold, and will also be more efficient at higher engine speeds in comparison to a fixed A:R turbocharger. An additional benefit in the VGT 30 is that the VGT does not require a wastegate to regulate rotational speed of the turbine wheel 46.

The VGT 30 also includes a compressor wheel 64 mounted on the shaft 34 between the first and second ends 36, 38. The compressor wheel 64 is configured to pressurize the airflow 26 being received from the ambient for eventual delivery to the cylinders 14. The compressor wheel 64 is retained inside a compressor cover 66 that includes a volute or scroll 68. The scroll 68 receives the airflow 26 from the compressor wheel 64 after the airflow has been compressed. The scroll 68 is configured to achieve specific performance characteristics, such as peak airflow and efficiency of the VGT 30. Accordingly, rotation is imparted to the shaft 34 by the post-combustion exhaust gases 23 energizing the turbine wheel 46, and is in turn communicated to the compressor wheel 64 owing to the compressor wheel being fixed on the shaft. As understood by those skilled in the art, the variable flow and force of the post-combustion exhaust gases 23 influences the amount of boost pressure that may be generated by the compressor wheel 64 throughout the operating range of the ICE 10.

As shown in FIG. 1, the vehicle 6 also includes a controller 60 having a memory and configured to regulate operation of the ICE 10, and specifically the operation of the VGT 30. As part of regulating operation of the VGT 30, the controller 60 is programmed for adapting control of the VGT 30 during the VGT's service life based on wear experienced by the vane mechanism 52 over time. The controller 60 may be a central processing unit (CPU) that regulates various functions on the vehicle 6 or a dedicated electronic control unit (ECU) for the ICE 10. In either configuration, the controller 60 includes a processor 60A and tangible, non-transitory memory 60B which includes instructions for the actuator 58 programmed therein. As such, the processor 60A is configured to execute the instructions from memory in the controller 60 to regulate the ICE 10, including the operation of the actuator 58.

The controller 60 is configured to command the vane mechanism 52 via the actuator 58 to perform at time T1 a vane sweep between an open-limit position 52A and a closed-limit position 52B, i.e., a between the limits sweep of the plurality of vanes 56, to identify an initial range R1 of movement of the vane mechanism. The time T1 may be an instance that occurs during a "hot test" of the ICE 10, i.e., an initial operating run of a newly assembled powerplant at a manufacturing facility to verify the powerplant's performance. Accordingly, the initial range R1 of movement of the vane mechanism 52 measured at time T1 provides a reference data point for subsequent determination of wear experienced by the vane mechanism. The controller 60 is also configured to store in the memory 60B thus identified initial range R1 of movement of the vane mechanism 52.

The controller 60 is also configured to command the vane mechanism 52 via the actuator 58 to perform at time T2 a vane sweep between an open-limit position 56A and a closed-limit position 56B of the vanes 56 to identify a current range of movement R2 of the vane mechanism. As understood by those skilled in the art, the open-limit position 56A and the closed-limit position 56B may remain consistent over time or change due to wear of the vane mechanism 52. The controller 60 is additionally configured to store in its memory 60B the identified current range of movement R2 of the vanes 56. The controller 60 is also configured to compare the current range of movement R2 with the initial range of movement R1 of the vane mechanism 52.

Furthermore, the controller 60 is configured to replace in the memory 60B the initial range of movement R1 of the vane mechanism 52 with the current range of movement R2 of the vane mechanism if the current range of movement R2 is equal to or greater than a predetermined range of movement R3. The predetermined range of movement R3 is stored in the memory of the controller 60B for subsequent retrieval and comparison with the current range of movement R2. The aforementioned predetermined range of movement R3 may be established by design calculations and/or empirically during testing and validation of the VGT 30 to indicate threshold performance of the VGT that is required for acceptable performance of the ICE 10. Thus replacing in the memory of the controller 60 the initial range of movement R1 with the current range of movement R2 of the vane mechanism 52 when the current range of movement R2 is equal to or greater than the predetermined range of movement R3 is configured, i.e., designed and programmed, to adapt operation of the VGT 30 and the ICE 10 to actual wear of the vane mechanism 52 between time T1 and time T2. The controller 60 may be additionally programmed to adapt control parameters of the ICE 10, such as fuel rate, to the current range of movement R2 of the vane mechanism 52 when the current range of movement R2 is equal to or greater than the predetermined range of movement R3.

The vehicle 6 may also include a sensory indicator 72. The controller 60 is configured to activate the sensory indicator 72 in the event that the current range of movement R2 of the vane mechanism 52 is less than the predetermined range of movement R3. The sensory indicator 72 may be a numerical code programmed into the controller 60 such that the code may be retrieved by service personnel during diagnostic procedures for the ICE 10. Additionally, and nonexclusively, the sensory indicator 72 may be a warning light configured to alert an operator of the host motor vehicle. The controller 60 may also regulate operation of the VGT 30 at every start of the ICE 10. Furthermore, in the vehicle 6, the controller 60 may regulate operation of the VGT 30 every at vehicle key-on or every vehicle key-off, i.e., when the vehicle operation is respectively initiated or stopped.

Additionally, the controller 60 may also be configured, i.e., programmed and include the hardware, to assess whether established enabling criteria 74 have been met prior to identifying the initial range of movement R1 of the vane mechanism 52, as illustrated in FIG. 1. The established enabling criteria 74 may for example be temperature of ambient outside air, i.e., ambient temperature, being greater than a preset value, engine air intake temperature being within a predetermined acceptable range, no presence of VGT 30 operation faults, and no presence of vane mechanism 52 faults. As understood by those skilled in the art, the ambient temperature may be determined by a sensor 76 and the engine air intake temperature may be determined by a sensor 78, both of which may then be communicated to the controller 60 for subsequent retrieval. The presence of VGT 30 operation faults and vane mechanism 52 faults may be identified by the controller 60 and stored in the memory 60B for subsequent retrieval, such as at every vehicle key-off.

Figure 4:
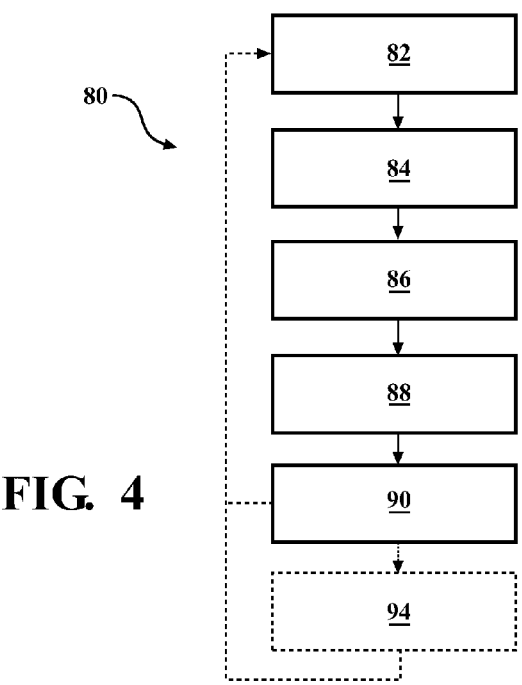
FIG. 4 is a flow diagram of a method of adapting operation of the VGT shown in FIGS. 1-3.

FIG. 4 depicts a method 80 of adapting control of the VGT 30, as described above with respect to FIGS. 1-3. The method 80 initiates in frame 82 with the controller 60 regulating operation of the ICE 10. In frame 82 the method may additionally include assessing via the controller 60 whether the established enabling criteria, as described above with respect to FIGS. 1-3, have been met prior to identifying the initial range of movement R1 of the vane mechanism 52. Following frame 82, the method 80 proceeds to frame 84, where it includes commanding via the controller 60 the vane mechanism 52 to perform at time T1 the sweep of the plurality of vanes 56 between the open-limit position 52A and the closed-limit position 52B to identify the initial range of movement R1 of the vane mechanism. After frame 84, the method advances to frame 86.

In frame 86, the method 80 includes storing in the memory 60B of the controller 60 the identified initial range R1 of movement of the vane mechanism 52. Following frame 86 the method 80 proceeds to frame 88, where the method includes commanding the vane mechanism 52 via the controller 60 to perform at time T2 the sweep of the plurality of vanes 56 between the open-limit position 56A and the closed-limit position 56B. As discussed above with respect to FIGS. 1-3, at time T2 the vane mechanism 52 is commanded to perform the sweep of the plurality of vanes 56 between the open-limit position 56A and the closed-limit position 56B to identify the current range of movement R2 of the vane mechanism. Following frame 86 the method 80 proceeds to frame 88, where the method includes storing in the memory 60B of the controller 60 the identified current range of movement R2 of the vane mechanism 52. After frame 88, the method 80 advances to frame 90, where it includes comparing via the controller 60 the current range of movement R2 with the initial range of movement R1 of the vane mechanism 52. Following frame 90, the method proceeds to frame 92.

In frame 92 the method 80 includes replacing in the memory 60B of the controller 60 the initial range of movement R1 with the current range of movement R2 of the vane mechanism 52 if the current range of movement R2 is equal to or greater than the predetermined range of movement R3 stored in the memory 60B of the controller to thereby adapt operation of the VGT 30 to the wear of the vane mechanism between the time T1 and the time T2. After frame 92, the method 80 may advance to frame 94, where the method includes activating via the controller 60 the sensory indicator 72 if the current range of movement R2 of the vane mechanism 52 is less than the predetermined range of movement R3. Following either frame 92 or 94, the method 80 may loop back to frame 82. Accordingly, the controller 52 may be programmed to continuously monitor the operation of the VGT 30, and specifically the vane mechanism 52, to adapt operation of the VGT and the ICE 10 to actual wear of the vane mechanism between time T1 and time T2.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of adapting operation of a variable geometry turbocharger (VGT) having a turbine housing, a turbine wheel retained inside the turbine housing and configured to be rotated by post-combustion gasses, wherein the turbine housing defines an inlet to the turbine wheel, and a variable position vane mechanism having a plurality of movable vanes arranged at the inlet, the method comprising:
commanding, via a controller having a memory, the variable position vane mechanism to perform at a time T1 a sweep of the plurality of vanes between an open-limit position and a closed-limit position to identify an initial range of movement of the vane mechanism;
storing in the memory of the controller the identified initial range of movement of the vane mechanism;
commanding, via the controller, the variable position vane mechanism to perform at a time T2 the sweep of the plurality of moveable vanes between the open-limit position and the closed-limit position to identify a current range of movement of the vane mechanism;
storing in the memory of the controller the identified current range of movement of the vane mechanism;
comparing, via the controller, the current range of movement with the initial range of movement of the vane mechanism; and
replacing in the memory of the controller the initial range of movement of the vane mechanism with the current range of movement of the vane mechanism if the current range of movement is equal to or greater than a predetermined range of movement stored in the memory of the controller to thereby adapt the operation of the VGT to the wear of the vane mechanism between the time T1 and the time T2.

2. The method of claim 1, further comprising activating via the controller a sensory indicator if the current range of movement of the vane mechanism is less than the predetermined range of movement.

3. The method of claim 2, wherein the sensory indicator is at least one of a numerical code programmed into the controller and a warning light.

4. The method of claim 1, wherein the variable position vane mechanism includes an actuator configured to perform the sweep of the plurality of vanes and communicate the initial and current ranges of movement of the vane mechanism to the controller.

5. The method of claim 1, wherein the VGT is mounted on an internal combustion engine in a motor vehicle, and wherein the method is performed at one of every vehicle key-on and every vehicle key-off.

6. The method of claim 5, wherein the controller is a central processing unit arranged on the vehicle and configured to regulate operation of the engine.

7. The method of claim 6, further comprising initializing the method by assessing via the controller whether established enabling criteria have been met prior to identifying the initial range of movement of the vane mechanism.

8. The method of claim 7, wherein the method is performed at every vehicle key-off, and wherein the established enabling criteria include an ambient temperature being greater than a preset value, engine air intake temperature being within a predetermined acceptable range, no presence of VGT operation faults, and no presence of vane mechanism faults.

9. A vehicle comprising:
an internal combustion engine having:
a cylinder configured to receive an air-fuel mixture for combustion therein;
a reciprocating piston disposed inside the cylinder and configured to exhaust post-combustion gasses from the cylinder; and
a variable geometry turbocharger (VGT) including:
a turbine housing;
a turbine wheel retained inside the turbine housing and configured to be rotated by the post-combustion gasses, wherein the turbine housing defines an inlet to the turbine wheel;
a variable position vane mechanism having a plurality of movable vanes arranged at an inlet to the turbine wheel; and
a compressor wheel mounted on the shaft between the first and second ends and configured to pressurize an airflow being received from the ambient for delivery to the cylinder; and
a controller having a memory and configured to regulate operation of the VGT by:
commanding the variable position vane mechanism to perform at a time T1 a sweep of the plurality of vanes between an open-limit position and a closed-limit position to identify an initial range of movement of the vane mechanism;
storing in the memory the identified initial range of movement of the vane mechanism;
commanding the variable position vane mechanism to perform at a time T2 a sweep of the plurality of vanes between the open-limit position and the closed-limit position to identify a current range of movement of the vane mechanism;
storing in the memory the identified current range of movement of the vane mechanism;
comparing the current range of movement with the initial range of movement of the vane mechanism; and
replacing in the memory the initial range of movement of the vane mechanism with the current range of movement of the vane mechanism if the current range of movement is equal to or greater than a predetermined range of movement stored in the memory of the controller to thereby adapt operation of the VGT to the wear of the vane mechanism between the time T1 and the time T2.

10. The vehicle of claim 9, further comprising a sensory indicator, wherein the controller is configured to activate the sensory indicator if the current range of movement of the vane mechanism is less than the predetermined range of movement.

11. The vehicle of claim 10, wherein the sensory indicator is at least one of a numerical code programmed into the controller and a warning light.

12. The vehicle of claim 9, wherein the variable position vane mechanism includes an actuator configured to perform the sweep of the plurality of vanes and communicate the initial and current ranges of movement of the vane mechanism to the controller.

13. The vehicle of claim 9, wherein the controller regulates operation of the VGT at one of every vehicle key-on and every vehicle key-off.

14. The vehicle of claim 13, wherein the controller is a central processing unit configured to regulate operation of the engine.

15. The vehicle of claim 14, wherein the controller is configured to initialize regulation of the VGT by assessing whether established enabling criteria have been met prior to identifying the initial range of movement of the vane mechanism.

16. The vehicle of claim 15, wherein the controller regulates operation of the VGT at every vehicle key-off, and wherein the established enabling criteria include an ambient temperature being greater than a preset value, engine air intake temperature being within a predetermined acceptable range, no presence of VGT operation faults, and no presence of vane mechanism faults.

17. A method of adapting operation of a variable geometry turbocharger (VGT) having a turbine wheel and a variable position vane mechanism having a plurality of vanes arranged at an inlet to the turbine wheel to wear of the vane mechanism, the method comprising:

commanding, via a controller having a memory, the variable position vane mechanism to perform at a time T1 a sweep of the plurality of vanes between an open-limit position and a closed-limit position to identify an initial range of movement of the vane mechanism;

storing in the memory of the controller the identified initial range of movement of the vane mechanism;

commanding, via the controller, the variable position vane mechanism to perform at a time T2 a vane sweep between an open-limit position and a closed-limit position to identify a current range of movement of the vane mechanism;

storing in the memory of the controller the identified current range of movement of the vane mechanism;

comparing, via the controller, the current range of movement with the initial range of movement of the vane mechanism;

replacing in the memory of the controller the initial range of movement of the vane mechanism with the current range of movement of the vane mechanism if the current range of movement is equal to or greater than a predetermined range of movement stored in the memory of the controller to thereby adapt operation of the VGT to the wear of the vane mechanism between the time T1 and the time T2; and activating, via the controller, a sensory indicator if the current range of movement of the vane mechanism is less than the predetermined range of movement.

* * * * *